Figure 1:
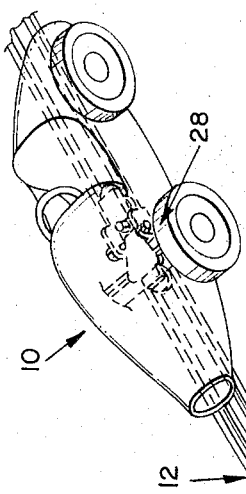

United States Patent [19]
Donohue et al.

[11] 3,782,293
[45] Jan. 1, 1974

[54] VEHICLE-TO-TRACK LINKAGE

[75] Inventors: Allen C. Donohue, Santa Clara; Albert O. Grote; Bernard P. Tielborg, both of Fresno, all of Calif.

[73] Assignee: Mini-Motor Speedways, Inc., San Francisco, Calif.

[22] Filed: Feb. 3, 1972

[21] Appl. No.: 223,172

[52] U.S. Cl. ............... 104/245, 104/60, 105/215
[51] Int. Cl. ............................................. B61f 9/00
[58] Field of Search ............... 104/53, 60, 63, 118, 104/139, 140, 141, 146, 243, 242, 244.1, 245, 246, 247; 105/215

[56] References Cited
UNITED STATES PATENTS

| | | | |
|---|---|---|---|
| 3,422,770 | 1/1969 | Celesia | 104/60 |
| 860,847 | 7/1907 | Beecher | 104/246 |
| 3,581,838 | 6/1971 | Rhodes | 104/244.1 |
| 3,410,223 | 11/1968 | Miller | 104/60 |
| 3,393,762 | 7/1968 | Matson | 104/243 |
| 3,048,124 | 8/1962 | Lovell | 104/60 |

*Primary Examiner*—Gerald M. Forlenza
*Assistant Examiner*—D. W. Keen
*Attorney*—Manfred M. Warren et al.

[57] ABSTRACT

A linkage is disclosed for connecting a self propelled vehicle to horizontally oriented guide rollers rollably supported by and between parallel pipe rails. The linkage includes a tongue plate with one end pivotally carried about a vertical pin secured to the guide roller support plate and the other end slidably and rotatably mounted on a horizontal rod secured to the undercarriage of the vehicle. The slidable tongue end is centered on the rod by a pair of opposing compression springs entwined on the shaft so as to urge the plate to its central position, yet permit the tongue to slide from one side of the shaft to the other when the vehicle departs from a course directly over the guide rails.

6 Claims, 3 Drawing Figures

3,782,293

VEHICLE-TO-TRACK LINKAGE

This invention relates to an improved linkage for connecting self-propelled amusement vehicles to an imbedded guide track laid out over the course which the vehicle is intended to follow.

Race tracks to accommodate self-propelled amusement vehicles, sometimes known as "go-carts," miniature race cars, or the like, equipped with imbedded tracks to generally guide and restrain such vehicles, while permitting a limited degree of steering control by the operator, and linkages to connect the track and cars have been developed. See U. S. Pat. No. 3,410,223 for RACE TRACK WITH COOPERATING RACE CAR RETAINING MEANS, by John H. Miller, patented Nov. 12, 1968.

The Miller patent discloses a race car, imbedded track, and linkage interconnecting the car and track. Such linkage as shown by Miller includes two universal joints. One operative half of one of the universal joints is secured to the car itself proximate the front axle, and one operative half of the other universal joint is secured to a roller carriage which rides in the embedded track assembly. Each of the other cooperating halves of the universal joints are attached to opposite ends of an elongated rod, thus completing the interconnection between car and track. See for example FIG. 3 of the aforementioned U. S. Pat. No. 3,410,223. Hence, the Miller vehicle may be independently steered, and is subject only to the restraint imposed by the elongate connector arm. The degree of freedom allowed by the two universal joints permits the Miller vehicle to be displaced vertically, e.g., to bank on two wheels when taking curves at sufficiently high speeds, or when "spinning-out," the more or less out-of-control manuever which occurs when the operator guides his vehicle through a curved portion of the track at such a high speed, that at the end of the curve the vehicle tends to keep turning and skiddingly spin about its mid-vertical axis before recovering to a position of straight away movement.

Under any of the foredescribed conditions of curvilinear motion, i.e., sharp turns, "spinning out," and the like, a serious problem oft times arises in the Miller mechanism in that when the vehicle is displaced vertically, a high degree of twisting moment is exerted at and through the track roller assembly into the track guides, particulary the flanges thereof--see FIG. 6 of the Miller patent. This is so because the two universal joints at each end of the elongated arm permits the car to be displaced vertically, and such upward movement when eventually constrained by the linkage, causes an upward force to be transmitted through the elongate arm into the roller assembly riding inside the track guide rails. Indeed, depending upon the rate of curvilinear movement causing such vertical movement in the first place, the resulting upward force and twisting moment may become great enough to virtually uproot the imbedded rail from its anchorage, and/or rupture the car linkage. In such case the car may run free of any restraint and cause serious bodily injury to the vehicle operator, spectators, and/or substantial property damage to the car itself and anything which might be in its uncontrolled path of movement. A partial solution to the foregoing problem has been found by modifying the track and roller assembly as disclosed in the Miller patent. Such modification entails substituting parallel pipe rails for the toe-to-toe channel rails shown therein; and a horizontal roller assembly for cooperative engagement with the parallel pipe rails--see FIG. 2 of the drawing accompanying this specification--in place of the vertical roller wheels utilized by Miller. However, even such modification, where used in combination with the double universal joint and elongate arm assembly of the Miller device still suffers from the imposition of vertical vehicle movement during certain maneuvers, and, as explained above, high twisting moments. Although the twin pipe rail and horizontal rollers are better able to cope with such high twisting moments than are the toe-to-toe channels and vertical rollers, still the beating which nonetheless results therefrom tends to uproot even the pipe rails, and may also damage the car-to-rail linkage. It is perhaps technically possible to "beef up" the Miller linkage, or others like it, and the pipe rails and roller assembly with which such components are associated, to withstand higher twisting moments. However, the resultant fabrication of such design would require relatively heavy and costly components, and thus generally be impracticable for the type of installation contemplated in the application of the instant invention.

Thus, it is an object of the present invention to provide a track-to-vehicle linkage for track guided vehicles which permits the operator of the vehicle steering freedom within a limited range of movement on either side of the track, while at the same time preventing vertical displacement of the vehicle during curvilinear maneuvers.

A feature and advantage of the invention therefor is that by preventing vertical displacement of the vehicle, aside from the relatively minor amount which occurs when the pneumatic tires on one side of the car depress during curilinear movement thereof, the amount of twisting moment transmitted through and to the linkage and track assembly is minimized.

It is a more specific object of the present invention to provide a car-to-track linkage which may be adapted for use with the parallel pipe rails and horizontally oriented cooperative rollers, so that side thrust and the relatively minor amount of vertical force imposed therethrough may be more effectively resisted with relatively little likelihood that the rail system itself be damaged.

A further feature and advantage of the invention is that by eliminating the imposition of significant twisting moments on and through the car-to-track linkage, the likelihood of damage thereto and resultant injury to persons and/or property is null.

Numerous other objects, features, and advantages will become apparent to one of ordinary skill in the art upon reading the specification which follows and with reference to the accompanying drawing.

Figure 3:
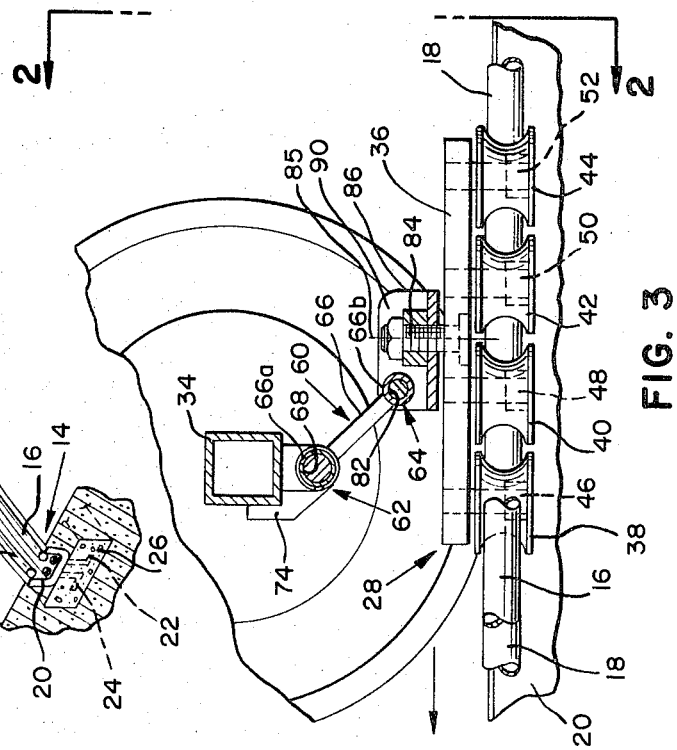
Figure 2:
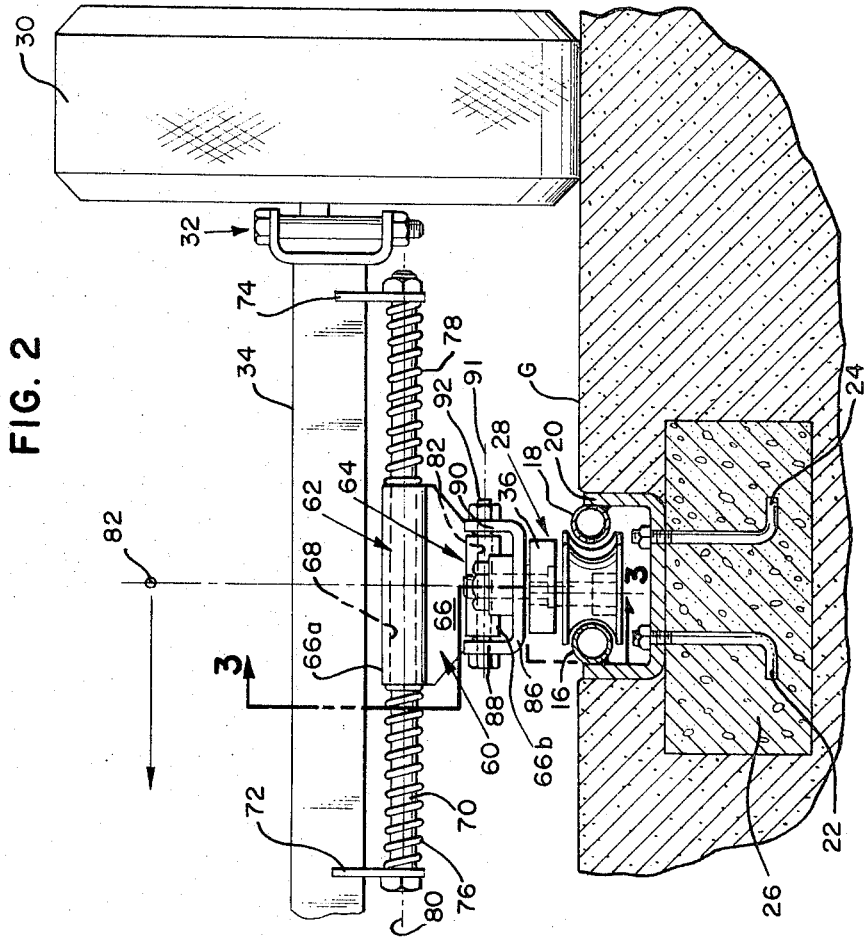

Turning now to the drawing, FIG. 1 is a perspective view of a vehicle and track arrangement embracing the present invention showing a portion of straight track and curved track, the latter in partial section at ground level to illustrate one arrangement for embedding the track guides;

FIG. 2 is a partial front elevation sectional view of the front end of a vehicle embodying our invention and is taken along line 2—2 of FIG. 3; and FIG. 3 is a sectional side elevation taken along line 3—3 of FIG. 2.

With particular attention first to FIG. 1 we show a typical self-propelled vehicle 10 adapted for movement over a predetermined course 12 defined by track assembly 14 comprising a pair of parallel pipe rails 16, 18. In the embodiment shown such rails are held in place in ground G by means of a plurality of brackets such as U-bracket 20. That is the upturned tip ends of the bracket are welded or otherwise appropriately secured to the pipe rails; each bracket is in turn secured by means of J-bolts 22,24 to imbedded concrete section 26. Other and additional brackets similar in every respect to bracket 20 are provided at intervals throughout the length of the track assembly as dictated by recognized structural principals. As depicted in FIG. 1 track assembly 14 may include straight portions as well as curves through which the vehicle is constrained to travel due generally to the carriage assembly and linkage structure associated therewith indicated at 28, the latter being of central importance to the present invention and explained in greater detail below. The constraint imposed by the carriage assembly and linkage guides nonetheless allows the operator freedom to steer the vehicle by conventional means therefor connected to front wheels shown in FIG. 2 mounted by way of conventional king-pin assemblies to vehicle undercarriage frame 34.

With the foregoing generally explaining the environment of the present invention, attention is again directed to the difficulties encountered in self-propelled vehicles of the type described herein, especially the severe dynamic strain imposed upon the track-to-vehicle linkage when the vehicle proceeds rapidly in a curvilinear portion of its course; and the linkage is of the type known in the prior art which allows the vehicle to be displaced vertically, for example banking on two wheels, thus imposing a high twisting moment upon the track follower mechanism. It has already been noted above that a partial solution to this problem has been found in the application of horizontal rollers to slidably support carriage assembly 28 within track assembly 14, a combination illustrated in the accompanying drawing and best seen in FIG'S. 2 and 3.

More particularly carriage assembly 28 comprises carriage plate 36 to which rollers 38, 40, 42 and 44 are rotatably secured for rotation in a horizontal plane by means of cantilievered or overhung vertical shafts 46, 48, 50 and 52, respectively. Each of such shafts possesses appropriate bearings or bushings for contact with the rollers in accordance with design practices known to those of ordinary skill in the art, and thus not further described herein nor shown in greater detail on the drawing. Such a carriage assembly is particularly adapted for slidable engagement between parallel pipe rails 16, 18, although it should be noted that the linkage of our invention to be described hereinafter may be employed with other types of track and roller assemblies. It is our preference however, to utilize the illustrated horizontal roller assembly and pipe rails because of their superior ability to withstand twisting and vertical reaction forces imposed thereon which occur to some degree, albeit minimized, even when our novel track-to-vehicle linkage is employed.

However, even with the use of the improved and preferred pipe track and horizontal roller assembly described above, vehicles whose track-to-vehicle linkages permit vertical displacement when executing rapid curvilinear manuevers, such as vehicles employing the type of linkage disclosed in the U.S. Pat. No. 3,410,223 referred to hereinabove, impose excessive and dangerous twisting moments upon and through their respective track carriage assemblies to the track systems upon which they travel. Such excessive twisting moments are minimized in accordance with the present invention by means of linkage assembly 60 and more particularly the mounting arrangements at either end of the linkage which connect the latter first to vehicle undercarriage member 34 and second to carriage assembly 28. More specifically each of these mounting arrangements, the first indicated at 62 and the second at 64, are designed to allow the vehicle frame to move relatively freely in certain horizontal aspects noted below, but prevent almost entirely any vertical movement of the vehicle, especially radical lifting of wheels on one side thereof when executing severe curvilinear maneuvers.

Examined more closely linkage assembly 60 comprises tongue plate 66 which at one end 66a is fabricated to provide an enlarged section through which is formed uniform bore 68. In addition, first mounting arrangement 62 includes elongate rod 70 which is properly sized for and placed in slidable and rotatable position within bore 68. Rod 70 in turn is carried at each of its ends by bearing plates 72, 74 which are welded or otherwise appropriately secured to front wheel undercarriage member 34. Compression springs 76,78 are provided each having opposite ends bearing against one of the two bearing plates 72, 74 and tongue end 66a, so as to urge the tongue to a central position on rod 70. Thus with respect to the mounting of tongue end 66a it may readily be appreciated that while the linkage is freely rotatable about horizontal axis 80, which is transverse to longitudinal axis 82 of the vehicle, and slidable back and forth along rod 70 parallel to that axis, any appreciable vertical displacement of the vehicle is constrained. (The rotational movement about rod 70 is of course essential to accommodate front and rear wheel road elevation differences.) Moreover the slidability of tongue 66 back and forth along rod 70 permits proper front end movement of the vehicle, for example due to steering, without over stressing the attachment which would occur if the connection were rigid.

The objective of preventing undue vertical displacement of the vehicle while allowing limited horizontal movement is also achieved by our invention in the design of the second mounting arrangement 64 located at tongue end 66b. This tongue end is also fabricated to provide an enlarged section through which is formed uniform bore 82. Directly adjacent thereto, and pivotally mounted on carriage plate 36 by means of vertical pin 84, we provide U-shaped carriage head 86. The vertical axis of pin 84 generally coincides with the central vertical axis 85 of carriage plate 36, so that as a result carriage head 86 is also freely pivotable thereabout, thus allowing the vehicle generally to rotate entirely freely about that axis, whether being steered or guided about curves in the course, or "spinning out" at the end of a curved portion of the track. Each upstanding leg 88, 90 of the U-shaped carriage head is bored to form holes whose axes 91 are parallel to bore 68 and forwardly therein of vertical axes 85. The carriage head holes are shaped to cooperatively receive connecting bolt 92 which rotatably connects tongue end 66b to the carriage head about an axis parallel to that of through bore 68 at the other end of the tongue. Thus with respect to the mounting of tongue end 66b is may readily be appreciated that while the linkage is freely rotatable about horizontal axis 91, rotation which is transverse to the longitudinal axis of the vehicle and necessary for front to rear wheel elevation differences, any appreciable vertical displacement of the vehicle is constrained.

Thus a self-propelled but track restrained vehicle equipped with the vehicle-to-track linkage embraced by our invention will enjoy the very beneficial and salutary advantages of a guided vehicle which may be steered to some degree in a horizontal plane, yet restrained almost entirely from being vertically displaced no matter what curvilinear maneuvers may be executed. Thus our invention overcomes the problems and difficulties encountered by the prior art devices of this type with which we are familiar in that our invention prevents the imposition of undue vertical forces through the track-to-vehicle linkage which may cause damage to track, vehicle, personnel and property, as explained more fully hereinbefore. At the same time our novel linkage permits limited horizontal movement, both rotational and transverse, so that the operator may enjoy the fun of steering the vehicle about curves, "weaving" when following straight track, "spinning out," and like thrilling maneuvers; and the vehicle itself may pitch between its front and rear wheels so as to avoid undue rigidity and strain on the linkage.

We claim:

1. In a self-propelled vehicle adapted for movement over a predetermined course, track means installed in the ground to define said predetermined course, and carriage means slidably housed in said track means for connection to said vehicle to constrain the latter to the course defined by said track means, the combination comprising:

linkage means interconnecting the undercarriage of said vehicle and said carriage means;

first mounting means secured to one end of said linkage means and to said undercarriage to secure said one end of the linkage means to said undercarriage so that said linkage is freely rotatable about a first horizontal axis transverse to the longitudinal axis of said vehicle, and slidable back and forth along said first axis; and second mounting means secured to the other end of said linkage means and to said carriage means to secure said other end to said carriage means so that said linkage is freely rotatable about a second axis parallel to said first axis and pivotable about a central vertical axis of said carriage means.

2. The invention of claim 1 wherein further said linkage means comprises a tongue member and said one end thereof proximate the undercarriage of said vehicle is fabricated to form a through bore of uniform diameter; and said first mounting means comprises an elongate rod shaped to slidably and rotatably fit within said through bore; and mounting means at each end of said elongate rod to securably carry the latter proximate the under carriage of said vehicle with the longitudinal axis of the rod positioned transverse to the longitudinal axis of said vehicle.

3. The invention of claim 2 wherein further spring means carried by said elongate rod to urge said one end of the tongue member along said rod to a position thereon coincident to the center of said vehicle.

4. The invention of claim 3 wherein further said spring means comprises a pair of compression spring sections, one mounted on each side of said one end of the tongue member.

5. The invention of claim 1 wherein further ssid linkage means comprises a tongue member and said other end thereof proximate said carriage means is fabricated to form a through bore of uniform diameter whose longitudinal axis is transverse to the longitudinal axis of said vehicle; and said second mounting means comprises a carriage head and a through bolt having a diameter to fit within said through bore, said carriage head including means to carry said through bolt and said tongue member when said through bolt is securably and rotatably engaged within said through bore.

6. The invention of claim 5 wherein further an upstanding pin secured to said carriage means;

a vertical bore formed in said carriage head shaped to pivotally embrace said upstanding pin rearwardly of said through bolt when said head is operably mounted on the carriage means and said vehicle.

* * * * *